United States Patent
Wang et al.

(10) Patent No.: US 12,103,077 B2
(45) Date of Patent: Oct. 1, 2024

(54) METALS-BASED ADDITIVE MANUFACTURING METHODS AND SYSTEMS WITH THERMAL MONITORING AND CONTROL

(71) Applicant: University of South Florida, Tampa, FL (US)

(72) Inventors: Michael Cai Wang, Tampa, FL (US); Rasim Guldiken, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 144 days.

(21) Appl. No.: 17/388,772

(22) Filed: Jul. 29, 2021

(65) Prior Publication Data

US 2022/0032376 A1    Feb. 3, 2022

Related U.S. Application Data

(60) Provisional application No. 63/191,718, filed on May 21, 2021, provisional application No. 62/706,051, filed on Jul. 29, 2020.

(51) Int. Cl.
*B22F 10/368*    (2021.01)
*B22F 10/85*    (2021.01)
(Continued)

(52) U.S. Cl.
CPC ............ *B22F 10/368* (2021.01); *B22F 10/85* (2021.01); *B22F 12/41* (2021.01); *B22F 12/45* (2021.01);
(Continued)

(58) Field of Classification Search
CPC .................. B23K 15/086; B28B 1/001; B22F 2003/1057
See application file for complete search history.

(56) References Cited

U.S. PATENT DOCUMENTS 9,127,998 B1   9/2015   Guldiken et al.
10,173,262 B2 *   1/2019   Helvajian ............. B29C 64/393
(Continued)

FOREIGN PATENT DOCUMENTS

CN    107249862    * 10/2017
EP    3590631 A1    1/2020
(Continued)

OTHER PUBLICATIONS

Wood, B. R., Heraud, P., Stojkovic, S., Morrison, D., Beardall, J., & McNaughton, D. (2005). A portable Raman acoustic levitation spectroscopic system for the identification and environmental monitoring of algal cells. Analytical chemistry, 77(15), 4955-4961.
(Continued)

*Primary Examiner* — Nicholas A Wang
(74) *Attorney, Agent, or Firm* — Quarles & Brady LLP

(57) ABSTRACT

A metals-based additive manufacturing machine and method are disclosed. The machine and method include a hybrid temperature monitoring system. The hybrid temperature monitoring system includes a Raman spectrometer, a single-element ultrasound transducer, and a phased-array ultrasound pair. The hybrid temperature monitoring system can generate a real-time three-dimensional temperature map of the melt pool and optionally a portion of the metal powder base and/or a formed portion of a desired artifact. The real-time three-dimensional temperature map can be used for optimizing the metals-based additive manufacturing process in real-time or during subsequent process runs.

20 Claims, 3 Drawing Sheets

(51) Int. Cl.
- B22F 12/41 (2021.01)
- B22F 12/45 (2021.01)
- B22F 12/46 (2021.01)
- B22F 12/90 (2021.01)
- B33Y 10/00 (2015.01)
- B33Y 30/00 (2015.01)
- B33Y 50/02 (2015.01)

(52) U.S. Cl.
CPC .............. *B22F 12/46* (2021.01); *B22F 12/90* (2021.01); *B22F 2203/11* (2013.01); *B33Y 10/00* (2014.12); *B33Y 30/00* (2014.12); *B33Y 50/02* (2014.12)

(56) References Cited

U.S. PATENT DOCUMENTS

| 10,562,132 B2 | 2/2020 | Zediker |
| 2019/0213338 A1 | 7/2019 | Zonouz et al. |

FOREIGN PATENT DOCUMENTS

| JP | 2018-523011 A | 8/2018 |
| WO | WO2016202530 | * 12/2016 |

OTHER PUBLICATIONS

Alhazmi & Guldiken. Quantification of Bolt Tension by Surface Acoustic Waves: An Experimentally Verified Simulation Study. Acoustics 1, 794-807 (2019).

Chivel, Y. & Smurov, I. On-line temperature monitoring in selective laser sintering/melting. Phys. Procedia 5, 515-521 (2010).

Degertekin, F. L., Guldiken, R. O. & Karaman, M. Annular-ring CMUT arrays for forward-looking IVUS: transducer characterization and imaging. IEEE Trans. Ultrason. Ferroelectr. Freq. Control 53, 474-482 (2006).

Guichard, F. et al. CO2 Spontaneous Raman Scattering: an alternative thermometry for turbulent reactive flows Spontaneous Raman Scat-tering: an alternative thermometry for turbulent CO 2 Spontaneous Raman Scattering: an alternative thermometry for turbulent reactive flows. (2018), 16 pages.

Guldiken, R. O., McLean, J. & Degertekin, F. L. CMUTS with dual electrode structure for improved transmit and receive performance. IEEE Trans. Ultrason. Ferroelectr. Freq. Control 53, 483-491 (2006).

Guldiken, R. O., Zahorian, J., Yamaner, F. Y. & Degertekin, F. L. Dual-electrode CMUT with non-uniform membranes for high electromechanical coupling coefficient and high bandwidth operation. IEEE Trans. Ultrason. Ferroelectr. Freq. Control 56, 1270-1276 (2009).

Guldiken, R., Jo, M. C., Gallant, N. D., Demirci, U. & Zhe, J. Sheathless size-based acoustic particle separation. Sensors 12, 905-922 (2012).

Heigel, J. C. & Lane, B. M. Measurement of the Melt Pool Length during Single Scan Tracks in a Commercial Laser Powder Bed Fusion Process. J. Manuf. Sci. Eng. Trans. ASME 140, (2018)7 pages.

Jo, M. C. & Guldiken, R. Active density-based separation using standing surface acoustic waves. Sensors Actuators, A Phys. 187, 22-28 (2012).

Kip, B. J. & Meier, R. J. Determination of the Local Temperature at a Sample during Raman Experiments Using Stokes and Anti-Stokes Raman Bands. 44, 707-711 (1990).

Leem, J., Wang, M. C., Kang, P. & Nam, S. Mechanically Self-Assembled, Three-Dimensional Graphene-Gold Hybrid Nanostructures for Advanced Nanoplasmonic Sensors. Nano Lett. 15, 7684-7690 (2015).

Liu, Y., Yang, Y. & Wang, D. A study on the residual stress during selective laser melting (SLM) of metallic powder. Int. J. Adv. Manuf. Technol. 87, 647-656 (2016).

Martinez, J., Sisman, A., Onen, O., Velasquez, D. & Guldiken, R. A Synthetic Phased Array Surface Acoustic Wave Sensor for Quantifying Bolt Tension. Sensors 12, 12265-12278 (2012).

Onen, O., Sisman, A., Gallant, N. D., Kruk, P. & Guldiken, R. A Urinary Bcl-2 Surface Acoustic Wave Biosensor for Early Ovarian Cancer Detection. Sensors 12, 7423-7437 (2012).

Papadakis, E. P., Fowler, K. A., Lynnworth, L. C., Robertson, A. & Zysk, E. D. Ultrasonic measurements of Young's modulus and extensional wave attenuation in refractory metal wires at elevated temperatures with application to ultrasonic thermometry. J. Appl. Phys. 45, 2409-2420 (1974).

Saltonstall, C. B., Serrano, J., Norris, P. M., Hopkins, P. E. & Beechem, T. E. Single element Raman thermometry. Rev. Sci. Instrum. 84, 064903 (2013) 9 pages.

* cited by examiner

METALS-BASED ADDITIVE MANUFACTURING METHODS AND SYSTEMS WITH THERMAL MONITORING AND CONTROL

CROSS-REFERENCE TO RELATED APPLICATIONS

This application is related to, claims priority to, and incorporates by references herein for all purposes U.S. Provisional Patent Application Nos. 62/706,051, filed Jul. 29, 2020, and 63/191,718, filed May 21, 2021.

STATEMENT REGARDING FEDERALLY SPONSORED RESEARCH

Not Applicable.

BACKGROUND

A significant barrier to widespread industry adoption of metals-based additive manufacturing (M-AM) is the lack of standardized, real-time quality monitoring, and control. A need exists for predictable and repeatable, in operando thermometry/thermography during selective laser melting (SLM) or laser powder bed fusion (L-PBF) M-AM processes. As the temperature distribution, heat flux, and thermal history within the metal powder bed and part directly affect the final material properties, part/surface quality, dimensional accuracy, and fabrication speed, there is a critical need for accurate and accessible real-time non-contact thermometry/thermography to reduce barriers for widespread implementation of M-AM throughout US manufacturers.

SUMMARY

In an aspect, the present disclosure provides a metals-based additive manufacturing machine. The machine includes a metal powder base build stage, a metals-based additive manufacturing light or electron beam source, a metals-based additive manufacturing controller, and a hybrid temperature monitoring system. The metal powder base build stage is adapted to receive a metal powder base for metals-based additive manufacturing of a desired artifact. The metals-based additive manufacturing light or electron beam source is adapted to melt the metal powder base in predetermined patterns to form portions of the desired artifact as a part of the metals-based additive manufacturing. The metals-based additive manufacturing controller directs steering of and emission from the metals-based additive manufacturing light or electron beam source to achieve the predetermined patterns. The metals-based additive manufacturing controller is optionally adapted to adjust the steering of and the emission from the metals-based additive manufacturing light or electron beam source in real time during the metals-based additive manufacturing based on received feedback comprising a three-dimensional temperature map of the melt pool. The three-dimensional temperature map optionally including a portion of the metal powder base and a formed portion of the desired artifact. The hybrid temperature monitoring system includes a Raman spectrometer, a single-element ultrasound transducer, a phased-array ultrasound transducer pair, a processor, and a memory. The Raman spectrometer is adapted to measure Raman scattering from Raman-active gas particles adjacent to the melt pool and optionally from Raman-active gas particles adjacent to the metal powder base. The Raman spectrometer is steerable to measure different locations on the melt pool and optionally different locations on the metal powder base. The Raman spectrometer is adapted to measure Stokes and anti-Stokes shifts. The single-element ultrasound transducer is movable beneath or within the metal powder base build stage. The single-element ultrasound transducer is adapted to transmit single-element acoustic pulses into the formed portion of the desired artifact, the metal powder base, and/or the melt pool during the melt. The single-element ultrasound transducer is adapted to receive reflected single-element acoustic pulses from one or more single-element locations on a stage-powder interface between the metal powder base build stage and the metal powder base, a stage-artifact interface between the metal powder base build stage and the formed portion of the desired artifact, an artifact-powder interface between the formed portion of the desired artifact and the metal powder base, an artifact-melt interface between the formed portion of the desired artifact and the melt pool, a powder-melt interface between the metal powder base and the melt pool, and/or a melt-gas interface between the melt pool and surrounding gases. The single-element ultrasound transducer is oriented to transmit the single-element acoustic pulses at an angle within 5° of normal relative to the stage-powder interface, the stage-artifact interface, the artifact-powder interface, the artifact-melt interface, the powder-melt interface, and/or the melt-gas interface. The phased-array ultrasound transducer pair is located beneath or within the metal powder base build stage. The phase-array ultrasound transducer pair is adapted to transmit phased-array acoustic pulses into the formed portion of the desired artifact, the metal powder base, and/or the melt pool during the melt. The phased-array ultrasound transducer pair is adapted to received reflected phased-array acoustic pulses from one or more phased-array locations on the stage-powder interface, the stage-artifact interface, the artifact-powder interface, the artifact-melt interface, the powder-melt interface, and/or the melt-gas interface, the phased-array ultrasound transducer pair is steerable to measure reflections from different locations on the stage-powder interface, the stage-artifact interface, the artifact-powder interface, the powder-melt interface, and/or the melt-gas interface. The phased-array ultrasound transducer pair has a variable-focus ultrasound transmitter. The phased-array ultrasound transducer pair has a beamforming receiver. The phased-array ultrasound transducer pair is oriented to transmit the phased-array ultrasound pulses at an angle of at least 5° away from normal relative to the stage-powder interface, the stage-artifact interface, the artifact-powder interface, the artifact-melt interface, the powder-melt interface, and/or the melt-gas interface. The memory has stored therein: (i) reference Raman spectra for the Raman-active gas particles and/or one or more equations derived from the reference Raman spectra; (ii) reference temperature-dependent acoustic impedances for the metal powder base build stage and/or the metal powder base; and (iii) instructions. The instructions, when executed by the processor, cause the processor to: a) receive Raman spectra from the Raman spectrometer for a plurality of the different locations on the melt pool and optionally a plurality of the different locations on the metal powder base; b) infer a surface temperature of the melt pool at the plurality of locations and optionally the metal powder base at the different locations by determining a temperature of the Raman-active gas particles by comparing the Raman spectra to the reference Raman spectra and/or by using data extracted from the Raman spectra in the one or more equations derived from the reference Raman spectra; c)

receive pulse-echo signals from the single-element ultrasound transducer, the pulse-echo signals containing information regarding the reflected single-element acoustic pulses from the one or more single-element locations; d) receive beamformed signals from the phased-array ultrasound transducer pair, the beamformed signals containing information regarding the reflected phased-array acoustic pulses from the one or more phased-array locations; e) determine a volumetric temperature of at least a portion of the melt pool and optionally the portion of the metal powder base and the formed portion of the desired artifact using the pulse-echo signals, the beamformed signals, the reference temperature-dependent acoustic impedances for the metal powder base, and geometric information regarding the geometric relationship between the reflected single-element acoustic pulses and the reflected phased-array acoustic pulses; and f) generate the three-dimensional temperature map of the melt pool and optionally the portion of the metal powder base and the formed portion of the desired artifact using the surface temperature and the volumetric temperature and optionally deliver the three-dimensional temperature map to the metals-based additive manufacturing controller. The instructions, when executed by the processor, optionally cause the processor to receive timing information from the metals-based additive manufacturing controller, the Raman spectrometer, the single-element ultrasound transducer, and/or the phased-array ultrasound transducer pair. The surface temperature is optionally a time-variable surface temperature based on the timing information. The volumetric temperature is optionally a time-variable volumetric temperature based on the timing information. The three-dimensional temperature map is optionally a time-variable three-dimensional temperature map based on the timing information. The metals-based additive manufacturing controller and the processor are optionally the same device.

In another aspect, the present disclosure provides a metals-based additive manufacturing method. The method includes: a) selectively melting, using planned operational parameters, a metal powder base in a predetermined pattern to form a first portion of a desired artifact as part of a metals-based additive manufacturing, the metal powder base located atop a metal powder base build stage; b) introducing more of the metal powder base atop the first portion of the desired artifact formed in step a); c) selectively melting, using the planned operational parameters, the metal powder base in a second predetermined pattern to form a second portion of the desired artifact as part of the metals-based additive manufacturing, the first portion and the second portion bonded to one another by the selectively melting; d) iteratively introducing more of the metal powder base and selectively melting, using the planned operational parameters, the metal powder base in additional predetermined patterns to form additional portions bonded to one another, the first portion, and the second portion, thereby forming the desired artifact; e) during the selectively melting of steps a), c), and/or d), acquiring Raman spectra from a Raman spectrometer for a plurality of different locations on a melt pool generated by the melting and optionally a plurality of different locations on the metal powder base, the Raman spectrometer adapted to measure Raman scattering from Raman-active gas particles adjacent to the melt pool and optionally from Raman-active gas particles adjacent to the metal powder base, the Raman spectra including Stokes and anti-Stokes shifts; f) during the selectively melting of steps a), c), and/or d), acquiring pulse echo signals from a single-element ultrasound transducer, the pulse echo signals being reflected from one or more single-element locations on a stage-powder interface between the metal powder base build stage and the metal powder base, a stage-artifact interface between the metal powder base build stage and the first portion of the desired artifact, an artifact-powder interface between the first portion, the second portion, or one of the additional portions of the desired artifact and the metal powder base, a powder-melt interface between the metal powder base and the melt pool, and/or a melt-gas interface between the melt pool and surrounding gases, the single-element ultrasound transducer oriented to transmit the single-element acoustic pulses at an angle within 5° of normal relative to the artifact-powder interface, the powder-melt interface, and/or the melt-gas interface; g) during the selective melting of steps a), c), and/or d), acquiring beamformed signals from a phased-array ultrasound transducer pair, the beamformed signals reflected from one or more phased-array locations on the stage-powder interface, the stage-artifact interface, the artifact-powder interface, the powder-melt interface, and/or the melt-gas interface; h) generating a three-dimensional temperature map of the melt pool and optionally the portion of the metal powder base and the first portion, the second portion, or the additional portions of the desired artifact using a surface temperature and a volumetric temperature, the surface temperature inferred by determining a temperature of the Raman-active gas particles by comparing the Raman spectra to reference Raman spectra and/or by using data extracted from the Raman spectra in one or more equations derived from the reference Raman spectra, the volumetric temperature determined using the pulse-echo signals, the beamformed signals, reference temperature-dependent acoustic impedances for the metal powder base, and geometric information regarding the geometric relationship between the reflected single-element acoustic pulses and the reflected phased-array acoustic pulses; and i) adjusting one or more of the planned operational parameters for the selective melting of steps c) and/or d) or future planned operational parameters for a subsequent selective melting in a subsequent metals-based additive manufacturing of a subsequent desired artifact based on the three-dimensional temperature map.

DETAILED DESCRIPTION

Before the present invention is described in further detail, it is to be understood that the invention is not limited to the particular embodiments described. It is also understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context.

Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

Figure 1:
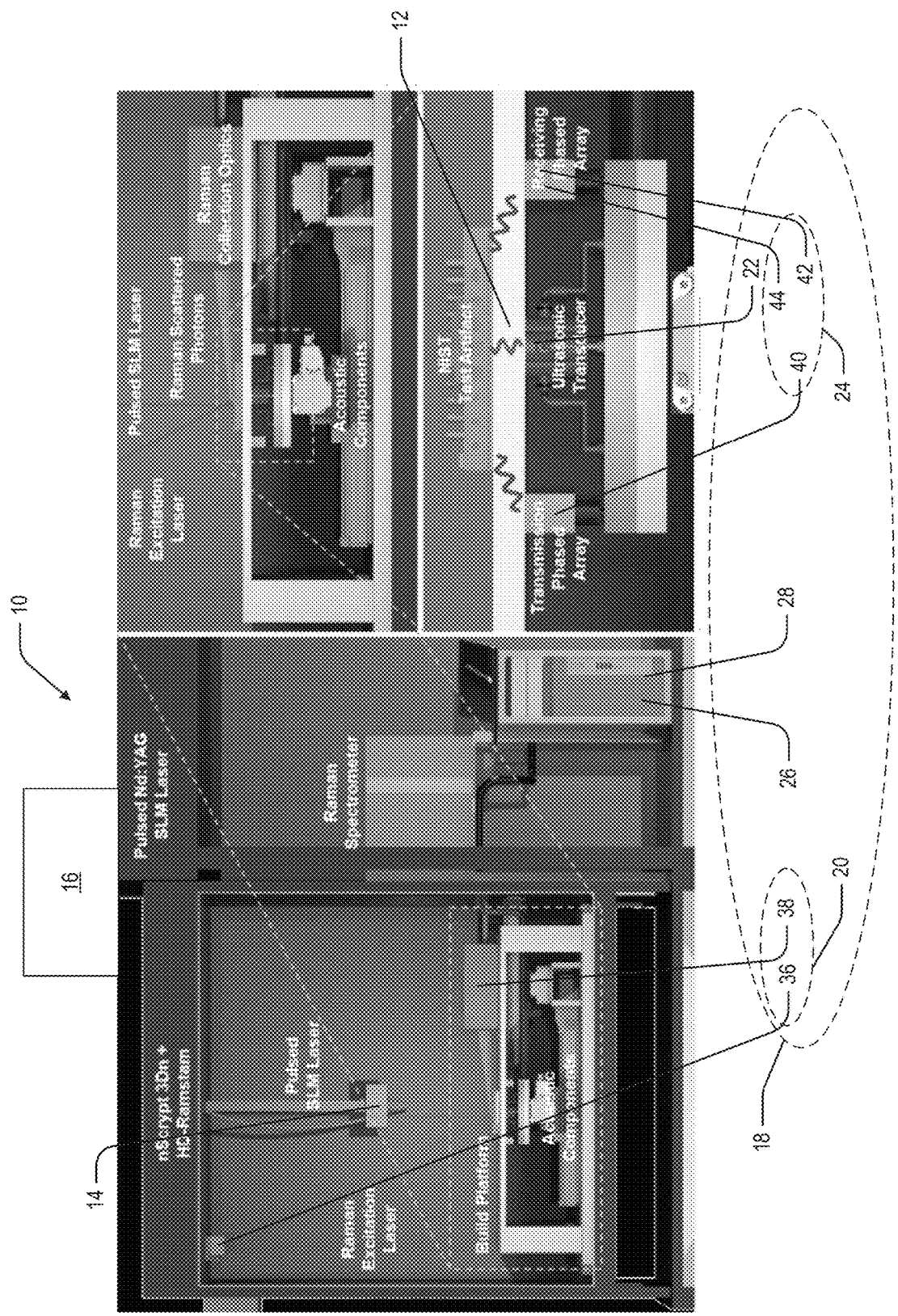
FIG. 1 is a metals-based additive manufacturing machine, in accordance with aspects of the present disclosure.

Referring to FIG. 1, a metals-based additive manufacturing (M-AM) machine 10 is disclosed. The M-AM machine 10 includes a metal powder base build stage 12, a M-AM light or electron beam source 14, a M-AM controller 16, and a hybrid temperature monitoring system 18. The hybrid temperature monitoring system 18 includes a Raman spectrometer 20, a single-element ultrasound transducer 22, a phased-array ultrasound transducer pair 24, a processor 26, and a memory 28.

In use, the machine 10 introduces metal powder base 30 atop the metal powder base build stage 12. The metal powder base is melted and converted into the desired artifact. The melted portion is identified as a melt pool 32. The M-AM light or electron beam source 14 forms the melt pool 32 in a predetermined pattern, which is based off the design of the desired artifact. A first predetermined pattern forms a first layer of the desired artifact. A second predetermined pattern forms a second layer of the desired artifact, which is bonded to the first layer. Subsequent predetermined patterns form subsequent layers, which are bonded to one another and to the first and second layer. The layers that have been formed prior to formation of the melt pool 32 in a given predetermined pattern constitute a formed portion 34 of the desired artifact.

Figure 2:
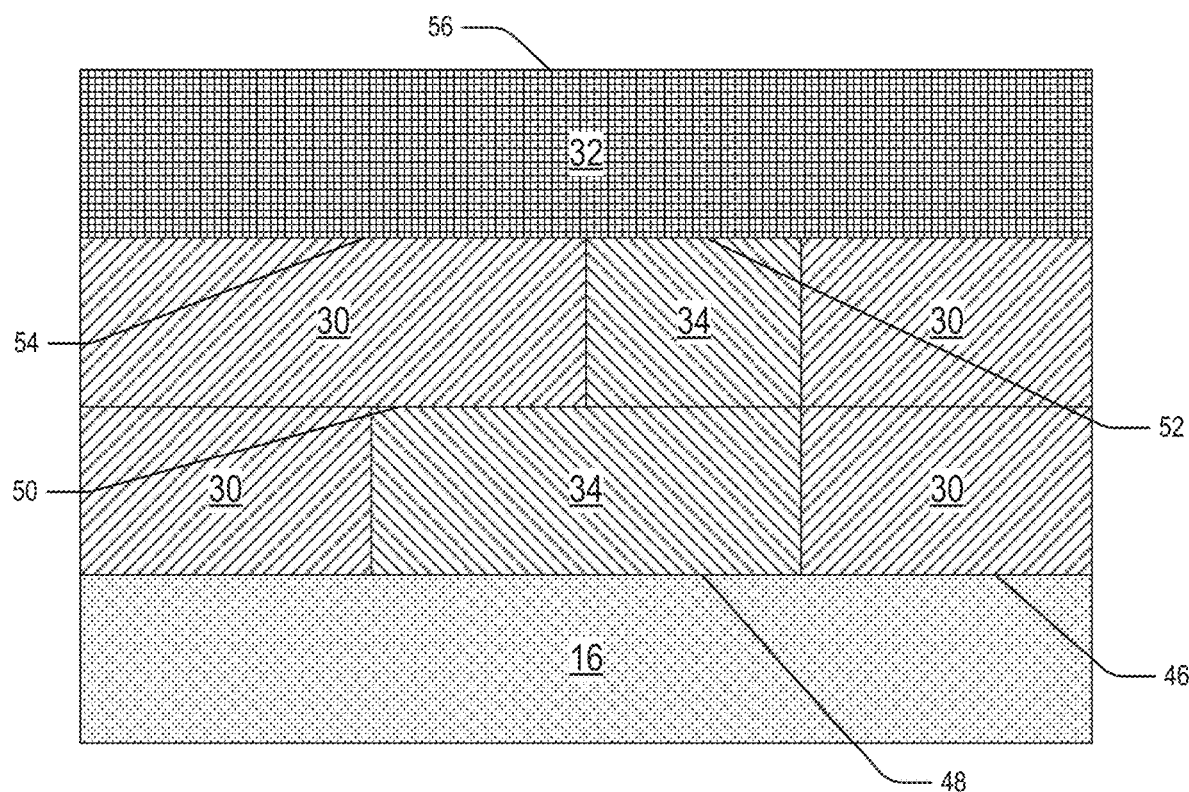
FIG. 2 is a schematic of the various materials and interfaces involved in the machines and methods described herein, in accordance with aspects of the present disclosure.

Referring to FIG. 2, a portion of the M-AM process is illustrated for the purposes of defining the various interfaces that are present during the process. The portion of the process that is illustrated is occurring during a melt and after a portion of the desired article has been formed. The schematic shows the metal powder base build stage 12. Atop the metal powder base build stage, the metal powder base 30 is present as well as a formed portion 34 of the desired artifact. In some cases, additional portions of the metal powder base 30 can be atop the formed portion 34 of the desired artifact. In cases where the desired artifact has openings, gaps, or other unfilled portions, the metal powder base 30 can filled those openings, gaps, or other unfilled portions, which can give rise to the formed portion 34 of the desired artifact being atop a part of the metal powder base 30. The melt pool 32 rests atop the metal powder base 30 and the formed portion 34 of the desired artifact. A stage-powder interface 46 is defined between the metal powder base build stage 12 and the metal powder base 30. A stage-artifact interface 48 is defined between the metal powder base build stage 12 and the formed portion 34 of the desired artifact. An artifact-powder interface 50 is defined between the formed portion 34 of the desired artifact and the metal powder base 30. An artifact-melt interface 52 is defined between the formed portion 34 of the desired artifact and the melt pool 32. A powder-melt interface 54 is defined between the metal powder base 30 and the melt pool 32. Finally, a melt-gas interface 56 is defined between the melt pool 32 and surrounding gases. In most cases, these interfaces are between materials having different acoustic impedances, so the acoustic pulses described herein will be partially reflected from these interfaces. The detected, reflected signals can be paired with information about the relative geometry of the detected, reflective signals are used as discussed below to determine a volumetric temperature.

The metal powder base build stage 12 is adapted to receive a metal powder base for M-AM of a desired artifact. The M-AM light or electron beam source 14 is adapted to melt the metal powder base in predetermined patterns to form portions of the desired artifact as a part of the M-AM. The M-AM controller 16 directs steering of and emission from the M-AM light or electron beam source to achieve the predetermined patterns.

The metal powder base build stage 12 is a conventional build stage used in M-AM machines with modifications made for placement, movement, and acoustic coupling of the single-element ultrasound transducer 22 and the phased-array ultrasound transducer pair 24. The modifications would be understood by those having ordinary skill in the acoustic arts and are not intended to be limiting. The relevant performance capabilities include the ability to direct the ultrasound in the fashion described herein, to move the single-element ultrasound transducer 22 while either maintaining acoustic coupling or to re-establish acoustic coupling following movement, and optionally to move the phased-array transducer pair 24. The relevant acoustic coupling at issue here is between the transducer 22/transducer pair 24 and the metal powder base 30, the formed portion 34 of the desired artifact, and the melt pool 32 during melting. In some cases, the build stage 12 is adapted to have a bottom surface that facilitates acoustic coupling with the single-element ultrasound transducer 22 and the phased-array ultrasound transducer pair 24, while facilitating movement of the single-element ultrasound transducer 22 and optionally the phased-array ultrasound transducer pair 24 beneath the build stage 12 while maintaining acoustic coupling. In some cases, the build stage 12 is adapted to accommodate the single-element ultrasound transducer 22 and the phased-array ultrasound transducer pair 24 within the build stage 12 and for the transducer or an acoustic impedance matching layer to directly form a portion of the upper surface of the build stage 12 on which the metal powder base is introduced for the M-AM process.

In situations where the single-element ultrasound transducer 22 and the phased-array ultrasound transducer pair 24 are adapted to be coupled to the metal powder base 30, the formed portions 34 of the desired artifact, and the melt pool 32 via the build stage 12 (i.e., when the acoustic signals pass through the build stage 12 prior to transmission above the build stage 12), the memory can have stored thereon acoustic properties of the build stage 12 and the processor can use portions of the received acoustic signals that are associated with the build stage 12 as a reference signal.

The M-AM light or electron beam source 14 can be a M-AM light source 14 or a M-AM electron beam source 14. The M-AM light source 14 can be a conventional light source for use in the M-AM process. The M-AM light source 14 can be a laser. The M-AM light source 14 can be a Nd:YAG laser, a $CO_2$ laser, a Yb-fiber laser, or an excimer laser. The M-AM electron beam source 14 can be a conventional electron beam source for use in the M-AM process. In some cases, the M-AM light or electron beam source 14 can be a single source. In some cases, the M-AM light or electron beam source 14 can be a multiplexed source. In some cases, the M-AM light or electron beam source 14 can have a continuous emission. In some cases, the M-AM light or electron beam source 14 can have a pulsed emission. In some cases, the M-AM light or electron beam source 14 can have a fixed wavelength. In some cases, the M-AM light or electron beam source 14 can have a tunable wavelength.

The M-AM controller 16 can be a conventional controller for an M-AM machine with or without software or hardware modifications for the features identified herein. A person having ordinary skill in the computer science arts will appreciate that the M-AM controller 16 can be implemented in a variety of ways that are not intended to be limiting to the scope of protection.

In use, the M-AM controller 16 directs steering of and emission from the metals-based additive manufacturing light or electron beam source to achieve melting in the predetermined patterns. The M-AM controller 16 can receive M-AM building plans for forming the desired artifact and execute those plans to form the desired artifact via the M-AM process.

The M-AM controller 16 also exhibits control over other optional features of the machine 10. As one example, the M-AM controller 16 optionally directs the automated lowering of the build stage 12 to allow the addition of more metal powder for forming additional layers of the desired artifact during the M-AM process. As another example, the M-AM controller 16 optionally directs the automated addition of metal powder to the build stage 12 and/or atop the existing metal powder and built portions of the desired artifact. It should be appreciated that there are a variety of ways for the M-AM machine 10 to introduce new metal powder for forming additional layers and the present disclosure is applicable to each, so long as the necessary acoustic couplings can be maintained, as would be understood by those having ordinary skill in the acoustic arts.

In some cases, the M-AM controller 16 is optionally adapted to adjust the steering of and the emission from the M-AM light or electron beam source 14 in real-time during the M-AM process. This adjustment can be based on received feedback. The received feedback can be in the form of a three-dimensional temperature map of the melt pool, as discussed elsewhere herein. In other words, the M-AM controller 16 can adjust a set of planned operational parameters during execution of an M-AM process based on measured temperature feedback from the hybrid temperature monitoring system 18.

This paragraph contains one specific, non-limiting example of an algorithm for utilizing the temperature information that is acquired using the systems and methods described herein. A general algorithm can include the following steps: 1) providing a three-dimensional CAD model; 2) geometry slicing; 3) loading the files for the desired artifact into a selective laser melting machine and path planning; 4) exposing the powder bed; 5) continuous and simultaneous monitoring of the temperature distributions within the melt pool, powder bed, portion of the desired artifact that has been already built, etc., as described in the systems and methods herein; 6) detect temperature anomalies (discontinuities, temperatures out of desired ranges—from $T_{melt}$, $T_{vap}$—etc.) detected in operando; 7) adjust laser parameters to compensate for the temperature anomalies (power, wavelength, focus, scan speed, pulse duration, etc.) in real-time; 8) lower build platform after each layer has completed; 9) coating of new powder layer; 10) repeat steps 4 through 9 until the desired artifact is complete; 11) remove desired artifice; 12) ex situ metrology to corroborate material results with in operando measurements from steps 5 and 6; 13) data from steps 5, 6, 7, and 12 is used to tune parameters for subsequent builds.

The Raman spectrometer 20 is adapted, configured, and positioned to measure Raman signals from gas molecules that are adjacent to the surface of the melt pool 32 and optionally from gas molecule that are adjacent to the surface of the metal powder base 30.

The Raman spectrometer 20 includes a Raman light source 36 and Raman collection optics 38. The Raman spectrometer 20 can have independent controls or controls integrated with other portions of the M-AM machine, including but not limited to the M-AM controller 16 and/or the processor 26.

The Raman light source 36 is adapted to excite the Raman-active gas particles with light having a wavelength that is selected to excite Raman-active modes within the gas particles. The Raman light source 36 is steerable and optionally has an adjustable focus, so the Raman light source 36 can illuminate a plurality of focal points adjacent to the surface of the melt pool 32 when the M-AM machine 10 is in use. A person having ordinary skill in optics and/or spectroscopy will appreciate that a variety of mechanisms can be used to steer and adjust focus of an optical beam, including but not limited to steerable mirrors, variable focus lenses, translation stages to move the entire light source, and the like. The specific way in which the Raman light source 36 is steerable and/or variable focus is not intended to be limiting.

The Raman light source 36 is tuned to one or more wavelengths of interest, which are selected for the Raman-active states of one or more Raman-active gas particles. In some cases, the Raman light source 36 emits multiple different wavelengths of light simultaneously. The Raman light source 36 can emit light having a wavelength of between 200 nm and 1100 nm. The Raman light source 36 can emit light having a wavelength of 244, nm, 257 nm, 325 nm, 364 nm, 457 nm, 473 nm, 488 nm, 514 nm, 532 nm, 633 nm, 660 nm, 785 nm, 830 nm, 980 nm, 1064 nm, or a combination thereof. A person having ordinary skill in the art of Raman spectroscopy will recognize that a variety of Raman active gas particles can provides the necessary Raman signals. Non-limiting examples of suitable Raman-active gas particles includes $CO_2$ and $CF_4$.

The Raman collection optics 38 include the necessary optics for collecting and analyzing light scattered from the plurality of focal points that can be illuminated by the Raman light source 36. A person having ordinary skill in optics and/or spectroscopy will recognize that a variety of hardware and software options exist for measuring Raman scattering from such a plurality of focal points and the description contained herein it not intended to be limiting. The Raman collection optics can include one or more of the following (this list is not intended to be exhaustive or limiting to the scope of the disclosure): one or more lenses; one or more optical apertures; one or more optical filters; one or more optical slits; one or more mirrors; one or more curves mirrors; a grating; a charge-collection device; a spectrophotometers; or combinations thereof. The Raman collection optics 38 can be selective to filter out light from the M-AM light or electron beam source 14 and from the Raman light source 36. One example of this selectivity is the use of two notch filters to filter out two different wavelengths of light.

The Raman spectrometer 20 and/or the Raman collection optics 38 are adapted to measure the Stokes and anti-Stokes shifts. For Stokes shifts, the Raman spectrometer 20 and/or the Raman collection optics 38 are adapted to sense Raman scattering from 1 $cm^{-1}$ to approaching infinity. For anti-Stokes shifts, the Raman spectrometer 20 and/or the Raman collection optics 38 are adapted to sense Raman scattering from −1 cm$^{-1}$ to approaching negative infinity. A person having ordinary skill in the optical arts will appreciate the bounds of approaching infinity and negative infinity in this optical context.

The single-element ultrasound transducer 22 is an ultrasound transducer that is capable of measuring A-line scans within the M-AM environment described herein, and particularly within formed metal parts, metal powders, and melt pools, such as those described herein.

The single-element ultrasound transducer 22 can be located beneath the metal powder base build stage 12. The single-element ultrasound transducer 22 can be located within the metal powder base build stage 12. The single-element ultrasound transducer 22 can be adapted for movement below and/or within the metal powder base build stage 22. In some cases, the single-element ultrasound transducer 22 is mounted to an automated movement stage to achieve movement. When movable, the single-element ultrasound transducer 22 can be moved to acquire single-element signals from multiple locations beneath the melt pool 32.

The single-element ultrasound transducer 22 is adapted to transmit single-element acoustic pulses into the formed portion 34 of the desired artifact, the metal powder base 30, and/or the melt pool 32 during the melt. In some cases, where the single-element ultrasound transducer 22 is positioned beneath the metal powder base build stage 12, the single-element ultrasound transducer is adapted to transmit the single-element acoustic pulses into the build stage 12.

The single-element ultrasound transducer 22 is adapted to receive reflected single-element acoustic pulses from one or more single-element locations on the stage-powder interface 46, the stage-artifact interface 48, the artifact-powder interface 50, the artifact-melt interface 52, the powder-melt interface 54, and/or the melt-gas interface 56.

The single-element ultrasound transducer 22 can be oriented to transmit the ultrasound into the system in roughly vertical alignment or at a roughly normal angle relative to a surface of the melt pool 32. In some cases, the single-element ultrasound transducer 22 is oriented to transmit the single-element acoustic pulses at an angle within 5° of normal relative to any one of the interfaces 46, 48, 50, 52, 54, and 56. If the radius of curvature is smaller than a spot size of the single-element ultrasound beam, then the curvature of the melt pool can be taken into consideration using methods known to those having ordinary skill in the acoustic arts.

The single-element ultrasound transducer 22 is adapted to measure reflections from the interfaces 46, 48, 50, 52, 54, and 56 and to infer the temperature of the material along the direction of propagation based on the timing of the reflections and the information stored regarding the acoustic properties of the materials.

The frequency of the single-element ultrasound is selected to optimize the signal-to-noise ratio, taking into account the frequency-dependent impact on focal length, attenuation/wave penetration, and the near-field/far-field transition point. The frequency of the single-element ultrasound can be between 100 kHz and 80 MHz, including but not limited to, between 1 MHz and 30 MHz, or between 5 MHz and 30 MHz. In some cases, the frequency of the single-element ultrasound is optimally between 20 MHz and 30 MHz.

The phased-array ultrasound transducer pair 24 includes a phased-array ultrasound transmitter 40 and a phased-array ultrasound receiver 42. The phased-array ultrasound receiver 42 includes beamforming electronics 44.

The phased-array ultrasound transmitter 40 is adapted to transmit phased-array acoustic pulses into the formed portion 34 of the desired artifact, the metal powder base 30, and/or the melt pool 32 during the melt. In some cases, where the phased-array ultrasound transducer pair 24 is positioned beneath the metal powder base build stage 12, the phased-array ultrasound transducer pair 24 is adapted to transmit the phased-array acoustic pulses into the build stage 12.

The phased-array ultrasound transmitter 40 is adapted to transmit phased-array acoustic pulses at a non-normal angle relative to the interfaces 46, 48, 50, 52, 54, and 56. In some cases, the phased-array ultrasound transmitter 40 is adapted to transmit phased-array acoustic pulses at an angle of at least 5° away from normal relative to the interfaces 46, 48, 50, 52, 54, and 56. The radius of curvature of the interfaces 46, 48, 50, 52, 54, and 56 may need to be taken into consideration when the radius is on the order of magnitude of the lateral resolution of the phased-array acoustic pulses.

The phased-array ultrasound receiver 42 is adapted to receive reflected phased-array acoustic pulses from one or more phased-array locations on the stage-powder interface 46, the stage-artifact interface 48, the artifact-powder interface 50, the artifact-melt interface 52, the powder-melt interface 54, and/or the melt-gas interface 56.

The phased-array transmitter 40 is steerable and variable-focus using principles understood to those having ordinary skill in the acoustic arts. Briefly, the relative phase of individual transduction elements are varied in order to cause constructive interference in the desired directions and destructive interference elsewhere. The phased-array ultrasound transducer pair 24 is capable of operating without moving the transmitter 40 or receiver 42, but it is contemplated that these parts are also movable in a similar fashion to the single-element ultrasound transducer, should such movement be needed to monitor different locations.

The frequency of the phased-array ultrasound is selected to optimize the signal-to-noise ratio, taking into account the frequency-dependent impact on focal length, attenuation/wave penetration, and the near-field/far-field transition point. In some cases, given the greater distance that needs to be traversed by the phased-array ultrasound, the frequency of the phased-array ultrasound is optimally between 5 MHz and 10 MHz. A person having ordinary skill in the acoustic arts will appreciate the necessary physical dimensions and other properties that are required for the phased array to generate phased-array ultrasound having the desired frequency. In some cases, optimization of the frequency can be performed using commercially-available optimization routines, such as those provided by the OmniScan series of Phased Array Flaw Detectors, available commercially from Olympus IMS, Center Valley, PA.

The single-element ultrasound transducer 22 and the phased-array ultrasound transducer pair 24 can have transduction elements formed from a piezoelectric material understood to those having ordinary skill in the art to be suitable for the purpose described herein. One non-limiting example of a suitable piezoelectric material is lead zirconate titanate (PZT).

The processor 26 is any processing device capable of executing the instructions described herein to achieve the ends described herein.

The processor 26 and the M-AM controller 16 can be the same device, such as a CPU, a computer, a smart device, a tablet, a smart phone, or the like, which is capable of serving as a general controller/processor for the M-AM aspects of the machine 10 and for the temperature monitoring aspects of the hybrid temperature monitoring system 18.

The memory 28 can be any readable memory device that is capable of storing information for retrieval, as would be understood by those having ordinary skill in computer memory. The memory has stored thereon the information necessary to extract the temperature of the Raman-active gas particles and to infer the surface temperature of the melt pool 32. In some cases, the memory has Raman spectra stored for comparison with the acquired Raman spectra, said comparison being capable of providing the temperature of the Raman-active gas particles. In some cases, the memory has one or more equations stored for inputting one or more values that are extracted from acquired Raman spectra for the purpose of determining the temperature of the Raman-active gas particles. A person having ordinary skill in the art of Raman thermometry will appreciate the variety of ways to store information that is needed to extract a measured temperature from the acquired Raman spectra.

The memory 28 can further have stored thereon instructions that, when executed by the processor 26, cause the processor to 26 execute the method 100 described below, portions of method 100, or other aspects of the thermography methods described herein. The instructions can, when executed by the processor, cause the processor to: a) receive Raman spectra from the Raman spectrometer for a plurality of the different locations on the melt pool and optionally a plurality of the different locations on the metal powder base; b) infer a surface temperature of the melt pool at the plurality of locations and optionally the metal powder base at the different locations by determining a temperature of the Raman-active gas particles by comparing the Raman spectra to the reference Raman spectra and/or by using data extracted from the Raman spectra in the one or more equations derived from the reference Raman spectra; c) receive pulse-echo signals from the single-element ultrasound transducer, the pulse-echo signals containing information regarding the reflected single-element acoustic pulses from the one or more single-element locations; d) receive beamformed signals from the phased-array ultrasound transducer pair, the beamformed signals containing information regarding the reflected phased-array acoustic pulses from the one or more phased-array locations; e) determine a volumetric temperature of at least a portion of the melt pool and optionally the portion of the metal powder base and the formed portion of the desired artifact using the pulse-echo signals, the beamformed signals, the reference temperature-dependent acoustic impedances for the metal powder base, and geometric information regarding the geometric relationship between the reflected single-element acoustic pulses and the reflected phased-array acoustic pulses; and f) generate the three-dimensional temperature map of the melt pool and optionally the portion of the metal powder base and the formed portion of the desired artifact using the surface temperature and the volumetric temperature and optionally deliver the three-dimensional temperature map to the M-AM controller.

The metal powder base 30 is composed of a metal powder that is itself composed of a material that will form the eventual desired artifact. The material can be selected from the group consisting of titanium, iron, steel, platinum, nickel, copper, aluminum, cobalt, chromium, rhenium, niobium, molybdenum, tungsten, thoriated tungsten, and combinations or alloys thereof.

Figure 3:
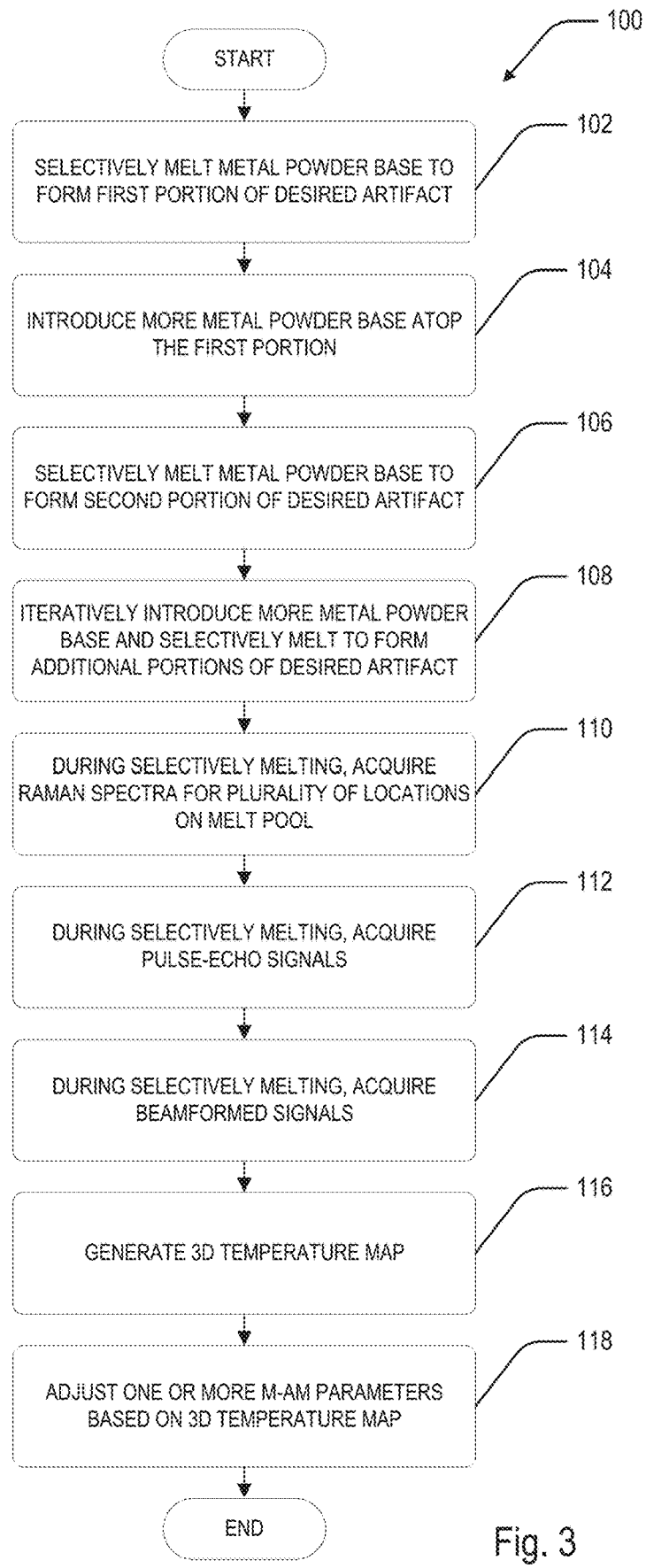
FIG. 3 is a flowchart of a method, in accordance with aspects of the present disclosure.

Referring to FIG. 3, a M-AM method 100 is disclosed. At process block 102, the method 100 includes selectively melting, using planned operational parameters, a metal powder base in a predetermined pattern to form a first portion of a desired artifact as part of a metals-based additive manufacturing, the metal powder base located atop a metal powder base build stage. At process block 104, the method 100 includes introducing more of the metal powder base atop the first portion of the desired artifact formed in process block 102. At process block 106, the method 100 includes selectively melting, using the planned operational parameters, the metal powder base in a second predetermined pattern to form a second portion of the desired artifact as part of the metals-based additive manufacturing, the first portion and the second portion bonded to one another by the selectively melting. At process block 108, the method 100 includes iteratively introducing more of the metal powder base and selectively melting, using the planned operational parameters, the metal powder base in additional predetermined patterns to form additional portions bonded to one another, the first portion, and the second portion, thereby forming the desired artifact. At process block 110, the method 100 includes, during the selectively melting of process blocks 102, 106, and/or 108, acquiring Raman spectra from a Raman spectrometer for a plurality of different locations on a melt pool generated by the melting and optionally a plurality of different locations on the metal powder base, the Raman spectrometer adapted to measure Raman scattering from Raman-active gas particles adjacent to the melt pool and optionally from Raman-active gas particles adjacent to the metal powder base, the Raman spectra including Stokes and anti-Stokes shifts. At process block 112, the method 100 includes, during the selectively melting of process blocks 102, 106, and/or 108, acquiring pulse echo signals from a single-element ultrasound transducer, the pulse echo signals being reflected from one or more single-element locations on a stage-powder interface between the metal powder base build stage and the metal powder base, a stage-artifact interface between the metal powder base build stage and the first portion of the desired artifact, an artifact-powder interface between the first portion, the second portion, or one of the additional portions of the desired artifact and the metal powder base, a powder-melt interface between the metal powder base and the melt pool, and/or a melt-gas interface between the melt pool and surrounding gases, the single-element ultrasound transducer oriented to transmit the single-element acoustic pulses at an angle within 5° of normal relative to the artifact-powder interface, the powder-melt interface, and/or the melt-gas interface. At process block 114, the method 100 includes, during the selectively melting of process blocks 102, 106, and/or 108, acquiring beamformed signals from a phased-array ultrasound transducer pair, the beamformed signals reflected from one or more phased-array locations on the stage-powder interface, the stage-artifact interface, the artifact-powder interface, the powder-melt interface, and/or the melt-gas interface. At process block 116, the method 100 includes generating a three-dimensional temperature map of the melt pool and optionally the portion of the metal powder base and the first portion, the second portion, or the additional portions of the desired artifact using a surface temperature and a volumetric temperature, the surface temperature inferred by determining a temperature of the Raman-active gas particles by comparing the Raman spectra to reference Raman spectra and/or by using data extracted from the Raman spectra in one or more equations derived from the reference Raman spectra, the volumetric temperature determined using the pulse-echo signals, the beamformed signals, reference temperature-dependent acoustic impedances for the metal powder base, and geometric information regarding the geometric relationship between the reflected single-element acoustic pulses and the reflected phased-array acoustic pulses. At process block 118, the method 100 includes adjusting one or more of the planned operational parameters for the selective melting of process blocks 106 and/or 108 or future planned operational parameters for a subsequent selective melting in a subsequent metals-based additive manufacturing of a subsequent desired artifact based on the three-dimensional temperature map.

The M-AM machine 10 and method 100 are adapted to operate without the use of an acoustic standard rod having known acoustic properties and being in touch with the metal powder, the desired artifact and/or the melt pool. The acoustic standard rod is conventionally used in thermography methods that are currently used in M-AM methods. In certain aspects of the present disclosure, the metal powder base build stage is used as an acoustic standard.

Features described with respect to the M-AM machine 10 are usable with the method 100. Features described with respect to the method 100 are usable with the M-AM machine 10. None of the features described herein are intended to be non-combinable with other features, unless the context clearly dictates otherwise.

Prophetic Example 1

Thermometry/Thermography for Metals-Based Additive Manufacturing

Thermometry is a vital component to M-AM for in-process sensing, monitoring, and model-based optimal control. Temperature profiles, melt pool dimensions, surface quality, etc. are greatly affected by the laser parameters and chamber conditions during M-AM processes. Thermometry methods via conventional infrared (IR) imaging provide limited spatiotemporal and spectral resolution and are predicated upon calibration of the complex surface emissivities.

Recent progress in hyperspectral IR imaging by researchers at NIST has made significant advances in the accurate quantification of real-time surface thermal profiles.4 To complement IR imaging, we are developing a novel thermographic scheme that hybridizes acoustics and Raman spectroscopy, which synergizes with established IR imaging to yield full-field, hyperspectral information of the entire powder bed and built-part. This Hybrid-Dual Raman+Acoustic Measurement Spectral Thermometry/Thermography for Additive Manufacturing of Metals (HD-Ramstam) enables real-time, high-resolution, simultaneous measurements of temperature profiles not only of the powder bed and melt pool surface, but also of the built layers buried within the powder bed.

The disclosed hybrid thermometry/thermography methods provide three primary advantages over conventional techniques, including improved spatiotemporal resolution, more accurate measurement fidelity, and the ability to measure temperatures within the full volume of the powder bed. Non-contact Raman thermometry is capable of diffraction-limited, sub-micron resolution while simultaneously elucidating spatiotemporally specific material properties such as porosity, defects, oxidation, etc. Acoustic thermography provides the ability to continuously map the entire temperature profile within the volume of the powder bed and the melt pool. This ability to obtain the real-time temperature distribution within the part in operando, as it is solidifying, gives us a significant opportunity to address the quality of the part being formed, one of the current limitations and perceived disadvantage of M-AM when compared to alternatives AM technologies. The full 3D volumetric thermographic information can more thoroughly elucidate the thermal history to better inform optimization of process parameters to mitigate thermal gradients, residual stresses, porosity, thus yielding higher quality and faster builds.

Acoustic Thermometry/Thermography

When ultrasonic (US) waves propagate through a medium, such as a metal powder bed, the reflection characteristics change as a function of the medium properties. We leverage this phenomenon to obtain the volumetric temperature profile, heat flux, and thermal history during M-AM. When a material is heated, it undergoes changes in the density and elastic modulus, in turn affecting the speed of sound traveling through it. In general, the speed of sound decreases in materials as they are heated. These differential speeds of sound can be measured and interpreted into the temperature of the materials by calibrating the speeds of sound through the material at ambient temperatures. Ultrasonics have been used for temperature measurements of solids, referred to as acoustic thermometry, by measuring the speed of sound changes propagating in a rod in contact with the solid made of varying materials such as 302 and 304 stainless steel, molybdenum, Inconel, and niobium-1% zirconium.

The advantage of acoustic thermometry in measuring temperature is that with a single propagating wave in a rod excited by a single transducer, arbitrary temperatures at multiple locations on the rod can be measured in operando. However, one major disadvantage of employing conventional acoustic thermometry for M-AM processing is that there needs to be a rod in contact with the melt pool or powder bed, which is not practical and conflicts with the M-AM process. The reason for the existence of a rod in the design is that it provides a well-calibrated reference where the precise distance the wave travels is known. In addition, for a given time, the temperature can only be measured on this rod and the specific locations where it is in contact with, hindering in operando measurement of the 3D temperature profiles. To address these shortcomings of conventional acoustic thermometry, we have re-engineered and customized the entire acoustic thermometry concept for the M-AM process by placing the acoustic transducers at the bottom of the M-AM stage and employing the stage and powder/melt pool as the acoustic "rod," for in-situ detection of the temperature gradient, heat flux and thermal history of the SLM/L-PBF part as it is solidifying. However, removing the rod from acoustic thermometry means that we now have information on neither the speed of the wave (which changes the time of flight) nor the thickness of the part manufactured (which also changes the time of flight). To address this challenge, we propose a dual-mode non-contact acoustical setup in this project, where one conventional US transducer operating in pulse-echo mode is placed underneath the melt pool, as well as an ultrasonic phased array pair operating in pitch-catch mode, placed offset from the melt pool with electronically steered varying depth along the axis extending from the US to the melt pool. The advantage of the dual-mode operation is that between the US and phased array setup, the speed of sound is the same, while the distance the wave travels is different, thereby decoupling the two factors affecting the time of flight, and allowing us to precisely obtain the 3-D volumetric temperature gradients and thermal history in operando during SLM or L-PBF.

Optical Thermometry/Thermography

Raman spectroscopy is a well-established optical analytical technique for non-contact measurement of compositions/stoichiometry, chemical bonding/configuration, and solid-state properties of materials. Raman spectroscopy is a widely used optical characterization and metrology technique that is ubiquitous in fields including materials science, pharmaceuticals, semiconductor manufacturing, and even law enforcement and forensics. In addition to elucidating the "molecular fingerprint" of materials, a lesser known and underexplored aspect of Raman spectroscopy is its capability to determine and map the temperature distribution of materials simultaneously with the aforementioned intrinsic material properties. Such non-contact Raman thermometry/thermography is intrinsic to the material state and is not dependent on a priori knowledge of the surface emissivity. These unique attributes present certain advantages to, and complements the well-established IR thermometry, as well as being perfectly synergistic to the volumetric information generated via acoustic thermography. Raman thermometry/thermography derives from the better-known Raman spectroscopy and is achieved by a combination of measuring the (i) characteristic Raman peak position (vibrational mode frequencies) as a function of temperature and/or (ii) through comparing the ratio of the anti-Stokes to Stokes signal strengths of a given specific Raman band. For a given material, there are usually several Raman bands (optically active phonon modes) that are useful for temperature determination. Their relative frequencies (Raman shift) and singularity (away from background Raman signals or fluorescence) are considered in guiding the experimental design of the most suitable Raman band(s) and the incident excitation wavelength for the temperature range in which the exact temperatures are to be determined. For materials with multiple such candidate modes, they can be acquired simultaneously in the spectra and cross-referenced for higher measurement confidence and fidelity.

M-AM Experimental Platform: nScrypt 3Dn

The prophetic example will be conducted within an nScrypt 3Dn system housed in the Functional Materials and Manufacturing Institute (FMMI) at the University of South Florida. This system is a multi-modal M-AM tool with a Lumera SUPER RAPID-HE Nd:YAG picosecond pulsed laser (1064 nm, 5-15 ps, Pave=30 W, Ppeak=30 MW) for melting, ablating, and cutting, which combined can enable metal parts with high-resolution (sub-micron) features via laser pre- and post-processing. This modular instrument enables multi-materials deposition with full control over the processing parameters and arbitrary time/temperature curing profile.

The nScrypt 3Dn system will serve as the M-AM test bed for the dual-mode acoustic and Raman thermometry/thermography components. These retrofitted/upgraded components consist of ultrasonic phased array transducer, conventional ultrasonic transducer, and laser Raman spectrometer. This custom hybrid system allows for real-time, in operando measurement of the powder bed and melt pool, where we will investigate the build of standardized M-AM parts such as the NIST Test Artifact (FIG. 1).

Design and Construction of Conventional Ultrasound Setup

For the conventional ultrasonic (US) setup of the dual-mode acoustical thermography, US excites the waves propagating through the stage. Some of the waves propagating in the stage will then be reflected off the stage-powder bed/melt pool interface back towards the US transducer due to the acoustic impedance difference between the stage and the powder/melt pool, allowing us to obtain the real-time temperature at the interface.

At the interface between the stage and powder bed/melt pool, some of the wave energy will transmit into the melt pool, allowing us to quantify the coupled real-time temperature and thickness of the melt pool as the part is being solidified. The NIST test artifact illustrated in FIG. 1 includes hollow components right above the stage, however it should be noted that those regions are occupied with powder during the SLM process when the temperature recording is taking place; during post processing of the component, the powders from these hollow cavities are removed, completing the part.

The measurements will be taken every 100 µs, corresponding to 10 kHz pulse repetition frequency (PRF) not interfering with the three orders of magnitude higher (20-30 MHz) transducer frequency. One may deduce that the melt pool surface needs to be flat for proper reading; however, for the transducer selected with 3 mm nominal circular aperture (D), the US beam diameter (BD), or spot size is 760 µm (BD=0.2568D). This indicates that the radius of curvature of the melt pool needs to be considered when the melt pool's radius is less than 760 µm.

The operating frequency of the transducer is important in that higher frequency increases signal-to-noise ratio (SNR) and focusing, while attenuation is increased, lowering the wave penetration, which can be problematic for thicker media. Also, the near-field length is directly proportional to the frequency. For the conventional US, the behavior of the transducer is well characterized both in the near- and far-field. Taking these considerations into account, our calculations indicate that the optimal frequency for the conventional US setup is 20-30 MHz. As discussed below, the optimal frequency for the phased array setup is substantially lower at 5-10 MHz. The reason for having a higher frequency in the conventional US setup is its unfocused nature, necessitating the smaller focal point and increased SNR. Additionally, as the US transducer is placed directly below the melt pool/powder bed area of interest, the penetration depth can be lower (higher frequency) than the phased array setup, which is located offset from the area of interest. Also, with 20-30 MHz operating frequency (f), 3 mm diameter aperture (D) and speed of the longitudinal wave in steel (5960 m/s), the near field distance N (N=D2f/4c) becomes 30-45 mm so we are either in the near field or just into the far-field, avoiding significant beam spreading which lowers the sensitivity of the temperature measurement.

It should be noted that the information obtained by the conventional US is a coupled 1D temperature distribution and thickness of the melt pool on an axis extending from the stage upwards into the melt pool. As the US is placed on a motorized position multi-axis stage, we will obtain the coupled 2D temperature distribution and thickness of the melt pool. However, this planar 2D temperature distribution lacks the thermal history provided by a 3D volumetric plot of temperature distribution, including heat flux. The 3D capability will enable us to investigate heat flux and distribution in any voxel within powder bed to better inform the FEM models developed and the selection of the best powder for a particular part. Besides, as discussed in Section b.2. This US based setup is capable of precisely obtaining the temperature at the stage-melt pool/powder bed interface as the exact thickness of the stage is known. However, as neither the thickness nor the wave propagation speed (which is a function of temperature) in the melt pool/powder bed is known, we will not be able to decouple the effect of these two parameters using conventional US alone.

Design and Construction of Phased-Array Setup

The phased array setup of the dual-mode acoustical thermography will allow us to decouple the effects of the thickness and the wave propagation speed (which is a function of temperature) in the melt pool/powder bed. When combined with the conventional US setup, we will obtain 3D volumetric plots of temperature gradient with a pair of linear phased ultrasonic transducer arrays operating in pitch-catch mode positioned below the stage offset from the laser. A linear ultrasonic transducer array consists of multiple (10-64 are common) separate individual transducers with a certain pitch (called acoustical aperture) on a single transducer housing. With an array transducer, as each element is pulsed sequentially, there will be multiple waves propagating through the stage. Naturally, some waves will combine in-phase with each other, summing the wave amplitude (focusing); some waves will cancel each other due to being out of phase. By adjusting the phase shift (time-shifting the wavefronts from each element), one can deterministically steer or focus the entire wave energy into a single wavefront dynamically, including to a particular depth on the axis extending from the stage into the melt pool/powder bed. In addition to this steering and focusing (increased SNR) ability of the wavefront, the receiving end can phase shift the signals received by each transducer element (called beamforming) to amplify further the signal received from a particular beam angle, focal distance and beam spot size. This unique capability of phased arrays is critical to successfully obtaining 3D temperature gradients in the SLM/L-PBF part manufactured from the powder bed.

The dual-mode acoustical setup consisting of conventional US transducer and a phased array pair placed at the bottom of the stage will allow us to obtain the real-time temperature distribution within the part in operando, as it is solidifying, giving us a significant opportunity to address the quality of the part being formed, one of the limitations and perceived disadvantage of M-AM when compared to its alternatives.

Transmitter Phased Array Optimization for M-AM

The optimization criteria for the phased array is quite different from the conventional US setup. First, the near-field length of any transducer (conventional US or phased array) is directly proportional to the frequency. This is important for the phased array setup as the beam focusing is accomplished only in the near field. Our calculations indicate that the optimal frequency for the phased array is 5-10 MHz, which is lower than the 20-30 MHz for a conventional US transducer setup. It should be noted that due to the unique advantages of phased arrays, namely focusing and beamforming, the transducer elements do not need to operate at as a high frequency as the US transducers. An illustrative example of focusing and beamforming is shown in Martinez et al., A Synthetic Phased Array Surface Acoustic Wave Sensor for Quantifying Bolt Tension, *Sensors* 12, 12265-12278 (2012), which is incorporated herein by reference for all purposes.

Additionally, due to the offset location of the phased array and beam steering, the waves will propagate farther distances necessitating lower operating frequency due to attenuation. For the selected ultrasonic phased array with 9.6-9.9 mm active aperture (D), 5-10 MHz operating frequency (f), and 3250 m/s shear mode acoustic wave velocity (c), the near field distance (N) ($N=1.3D^2f/4c$) becomes 46 mm to 75.4 mm. This is the upper limit at which distance electronic focusing can be accomplished. Note that at the proposed −30° or 30° beam steering angle (which corresponds to first critical angle), only the shear mode exists, while longitudinal wave no longer exists. Beam steering capability of the phased array is inversely proportional to the individual transducer element size, with a minimum element size of one wavelength due to the existence of strong side lobes, incorporating "blind spots" in the steering angles. For these reasons, the selected element size is 200 µm to 300 µm. The number of elements in the array is typically determined by a careful balance between the requested steering angle limits, focal spot size (better with higher element numbers), and complexity of the data obtained (simpler with lower element numbers). For the 5-10 MHz operating frequency, this balance is achieved with 10 to 32 elements per array. From the available commercial phased arrays, we selected two that fit all the design criteria: one operating in the lower end of the optimized frequency at 5 MHz with 16 elements and one at the upper range of the optimized frequency at 10 MHz with 32 elements. Both of these arrays are capable of −30° to 30° steering (which is its first critical angle) when they are connected to a 0° angle wedge commonly referred to in practice as a straight plastic shoe. To clarify, the wedge angle and beam steering angle are different concepts, we are capable of steering the beams −30° to 30° with the phased array selected connected to a 0° angle straight plastic shoe.

Receiving Phased Array Optimization for M-AM: Beam Forming

As the incident waves propagating in the stage at an angle reach the interface between the stage and powder bed/melt pool, some of the wave energy will be reflected with the same angle as the propagating wave, and some of the wave energy will continue to propagate into the powder bed with a different angle than the incident wave angle, called the refraction angle. The refraction angle is well characterized according to Snell's law:

$$\frac{\sin(\theta_1)}{\sin(\theta_2)} = \frac{C_1}{C_2}.$$

The speed of sound at the interface is a function of temperature, however as discussed above, we can precisely obtain the speed of sound at the interface by using the US setup alone, so this precise speed of sound will be employed in Snell's law. The propagating wave in the melt pool/powder bed will then be reflected back from the powder bed/melt pool surface towards the receiving transducer. The advantages of the phased array as the receiver are two folds. First, all the waves from the stage interface and powder bed/melt pool are be able to be captured without physically moving the receiving array. Also, as the part is solidified, the exact location of the receiving wave on the phased array will shift due to increased time of flight; beamforming will differentiate this thickness change easily. One may deduce that the melt pool surface needs to be flat for proper reading; however, for the phased array selected with a lateral element size of 0.31 mm to 0.6 mm, the lateral measurement resolution will be 80 µm to 150 µm, (quarter of the lateral element size at these frequencies). This indicates that the radius of curvature of the melt pool needs to be considered when the melt pool's radius is less than 150 µm.

The second significant advantage of employing a phased array as a receiver is its beamforming capability. For beamforming, a grouping of 4 elements will be used, increasing the effective aperture of the array, increasing the sensitivity, and sharpening the focus while reducing the spurious beam spreading. The element step will be selected as one, indicating that each A-scan will be obtained from elements 1-4, 2-5, 3-6, so on and so forth. OmniScan X3 phased array instrument will post-process the received signals by employing beamforming fundamentals and display them in time-based C-Scan. Although this instrument is highly capable, there are a multitude of settings that need to be optimized to obtain temperature information, as this is not the main application space of the OmniScan. The unique configuration change would be the synchronization gate configuration, which, in fact, is not employed commonly and typically only used for sharper C-Scan surface interface signals in immersion tanks. However, this capability will allow us to synchronize the A-scan Gate A to be aligned with the stage, and powder bed/melt pool interface as the 0 mm position in the C-scans, as that is the closest location of the temperature measurement area of interest. This will increase the resolution of the temperature measurement within the melt pool as it is solidifying, as the focal spot depth will then be on an axis starting with the stage melt pool/powder bed interface extending into the melt pool/powder bed. This is unique in that typically, the Gate A synchronization is selected as the wedge-media interface for the traditional application space, which is non-destructive testing. The time corrected gain (TCG) point will be placed at the melt pool solidification region in real-time to increase the temperature measurement sensitivity further.

In some cases, an 8-element grouping may be used instead of a 4-element grouping, doubling the effective aperture. In some cases, the element step can be selected as ½, which electronically simulates half a step, indicating A-scans from element numbers 1-3, 1-4, 2-4, 2-5, 3-5, 3-6, and so forth, effectively doubling the number of signals received for beamforming. In some cases, a 0 dB gain in OmniScan can be used, which allows amplification of the signal received, as needed.

Design and Construction of Confocal Raman Thermometry/Thermography Setup

Non-contact Raman thermometry/thermography will be applied to measure the powder bed surface and melt pool temperatures by analyzing the shift of Raman peak position of a specific Raman band and through the ratios between the anti-Stokes to Stokes signal strengths, where their relative intensities follow a Boltzmann distribution of the ground and first excited state populations. By acquiring the spontaneous (non-coherent) Raman spectra through confocal optics and a charge coupled device (CCD) detector, we are able to measure the material temperature by counting the localized Raman scattered photons. We designed a custom, long working distance confocal Raman thermometry/thermography setup to be retrofitted into the nScrypt system.

A galvo positioner combined with a long focal-length lens focuses and rasters the incident laser excitation from multiple laser sources (532/785/1064 nm) onto the powder bed surface. Since pure metals do not have optically-active Raman modes, we interrogate the temperature of the gas molecules immediately above the powder bed/melt pool surface within a single micrometer, thereby generating hyperspectral images of the spatially-resolved Raman spectra. To further improve thermometry sensitivity, we will explore the use of labelling gases such as $CO_2$ or $CF_4$ inside the 3D printer chamber. This optical thermography has a fine spatial resolution defined by the Raman signals scattered from the blanket gas molecules immediately above the metal surface, confined to the focal volume, $$V = \frac{233n\pi^{3/2}w^3}{NA},$$

where 2.33n/NA is the resolution of the objective in the vertical, or z, direction divided by the resolution in the x-y plane, and w is the laser beam radius in the x-y plane. For numerical aperture=0.01, n=1.46, w=2 μm, the confocal volume is very tightly confined to only 1.5E-5 $mm^3$.

The custom telescopic collection optics assembly consists of long working distance lenses and a pinhole aperture for tunable confocality, which filters out defocused photons to spatially confine the analysis volume, thus improving contrast and depth of field. A dual-axis linear stage rasters the focal spot in synchrony with the laser galvos to span the entire metal powder surface, enabling not only stationary point thermometry but also fast-rate hyperspectral thermography across arbitrary regions on the surface. The custom instrumentation enables measurement of both the Stokes and anti-Stokes modes by detecting phonon-shifted photons at wavelengths both longer and shorter than that of the excitation laser, respectively. This is accomplished by the notch filter, which acts as a band filter to block out the monochromatic laser line while passing both the Raman-scattered Stokes and anti-Stokes wavelengths. Fiber optics guide the photons from the collection optics to the Raman spectrometer to decouple the mechanical movement of the high-speed linear stage and collection optics from the stationary delicate spectrometer optics. Accurate measurement of the Raman spectra requires fine spectral resolution ($\delta\lambda$), $$\delta\lambda = \frac{RF \times \Delta\lambda \times w_s}{n \times w_p},$$

where $W_s$ is the slit width, $\Delta\lambda$ is the spectral range of the spectrometer, $W_p$ is the pixel width, and n is the number of pixels in the CCD detector. The resolution factor (RF) is determined by the slit width and pixel width. When $W_s \approx W_p$, the RF is 3, when $W_s \approx 2W_p$ the RF drops to 2.5 and continues to drop until $W_s > 4W_p$ when the RF levels out to 1.5. In our Raman configuration, we use a confocal 10 μm slit aperture, a 1200 grooves/mm grating, a 14 μm wide 1024×58 pixel detector and a wavelength range from 200 nm-1100 nm. The calculated resolution is 0.28 cm' for 1064 nm excitation and 1.13 cm' for 532 nm excitation. Moreover, 2400 grooves/mm gratings will be applied for 532 nm excitation to achieve even higher spectral resolutions.

Optimization of Thermometry/Thermography: Raman Stokes Mode Evolution

Spatially- and spectrally-precise Raman thermometry and thermography will be achieved by monitoring the Raman peak frequency of a specific Raman band as a measure of the local material voxel temperature. The evolutions in the Raman band position and shape (peak symmetry due to degeneracies) as a function of temperature arise from changes in the material's interatomic bond lengths and vibrational force constants. Specifically, bond length elongates with temperature along with concomitant decreases in the energy of the vibrational mode (phonon softening) and reduction in the bond vibrational force constant (phonon softening). Conversely, as material temperature decreases, bond lengths shorten, leading to an energy increase of the vibration modes (phonon stiffening). These changes in the bond lengths affect the corresponding interatomic vibrational force constants, which result in shifts of the corresponding optical Raman mode frequencies (units of wavenumbers ($cm^{-1}$)).

When Raman peak position shifts or the peak shape changes (broadens or narrows) with temperature, analysis of peak characteristics is the most direct and widely-used manner for thermometry. The Stokes Raman bands shift to lower energies (red-shift) with increasing temperature and vice versa (blue-shift with decreasing temperature). Precise spectral determinations require instrumentation with fine, sub-cm$^{-1}$ spectral resolution and are most accurate when the peaks are narrow (measured from the full-width at half maximum) with a well-defined center position.

We have developed a preliminary finite element model (FEM) to correlate the temperature distribution within the thin gas layer just microns above the melt pool and powder bed. See, Jaramillo-Fernandez, J., Chavez-Angel, E. & Sotomayor-Torres, C. M. Raman thermometry analysis: Modelling assumptions revisited. *Appl. Therm. Eng.* 130, 1175-1181 (2018), which is incorporated herein in its entirety by reference. The FEM showed a less than 1% differential in the local temperature between the gas and metal, indicating that the thin gas layer is an excellent proxy for thermography of the powder bed surface and melt pool. Using empirical data from acoustic and Raman thermography, we will refine the model with coupled multi-physics simulations in ANSYS and FLUENT to capture the complex interactions at the gas/solid interface to precisely quantify the temperature distribution and heat fluxes.

Optimization of Thermometry/Thermography: Raman Stokes/Anti-Stokes Ratios

To complement the thermometry/thermography via peak shift of only the Raman Stokes mode (see above), we simultaneously measure the relative intensities of the Raman Stokes versus the anti-Stokes signal strengths, which are indicative of the ground and first excited vibrational states' populations, respectively. This mode of thermometry based on statistical thermodynamics stems from the Boltzmann distribution of the ground (phonon) state population versus the first excited state populations, and is determined by comparing the signal strengths of a particular Raman mode at its complementary Stokes and anti-Stokes positions.

At lower temperatures, the partition function gives that the ground state is more populated than the excited state for oscillators (phonons) with energy proportional to the resonance frequency of Raman band position. Therefore, the temperature of a material can be determined through measuring the relative energy states from the respective signal strengths of the anti-Stokes versus Stokes modes, $$\frac{I_{as}}{I_s} = \frac{(f_v + f_l)^3}{(f_v - f_l)^3} e^{\left(\frac{-hf_v}{kT}\right)}.$$

Here, T is the material temperature in Kelvins, k is the Boltzmann's constant, h is the Planck's constant, $f_l$ is the frequency of the excitation laser, $f_v$ is the frequency of the vibrational mode (Raman peak position), $I_s$ is the Stokes Raman scattering strength, and $I_{as}$ is the anti-Stokes Raman scattering strength. Signal intensities of the Raman Stokes ($I_s$) and anti-Stokes ($I_{as}$) modes are acquired by measuring the photon counts at the fitted Raman peak maxima subtracted from the spectrum baseline/background. When the material voxel within the optical focal volume increases in temperature, the Stokes intensity decreases simultaneously with an increase in the complementary anti-Stokes intensity, and vice versa.

This relative change in the Stokes versus anti-Stokes intensities is dependent on the energy levels of the respective Raman vibrational modes, as the energy of the vibrational mode directly affects the populations of the ground and excited states. At some given temperature, the higher the energy of the phonon vibrational mode is, the lower the population of the excited (anti-Stokes) state is, and therefore, the weaker the signal strengths (photon counts) of the anti-Stokes Raman mode. At higher energies in the Stokes spectrum (higher wavenumbers), the corresponding anti-Stokes band intensity becomes progressively weaker because the thermal energy at ambient temperatures is insufficient to populate the excited states of the anti-Stokes vibrational modes at higher energies. Therefore, the anti-Stokes band strength diminishes with increasing energy of the vibrational mode (higher frequency/wavenumber) because of the decreased population of the excited state. We select Raman modes with strong anti-Stokes signatures as a function of temperature for improved SNR and, therefore, more confident temperature determination.

Therefore, for thermometry/thermography based on comparing the Stokes vs. anti-Stokes signal intensities, it is important to compute the Boltzmann distribution based on characteristic Raman bands that are "clean" and consist of a single, easily distinguishable vibrational mode (absence of adjacent shoulder peaks, asymmetric broadening/narrowing, nor merging of adjacent peaks) and one that manifests small shifts with changing temperatures. Having such a "clean" spectra is conducive for unambiguously quantifying the lower Stokes signal and higher anti-Stokes signal with increasing temperatures.

To help standardize Raman thermometry/thermography methods and experimental protocol and build a reference database for the various metals and chamber environments, we will determine the optimal configuration between Raman mode selection and excitation laser wavelength for various temperature ranges. To demonstrate this optimization scheme, we plotted the ratio of anti-Stokes to Stokes signal strengths as a function of temperature to observe the thermometry gauge factor and their optimal operating ranges. This visually illustrates how temperature, Raman shift, and laser excitation wavelength interact through the Boltzmann relation and guides optimal Raman thermometry protocols. To view this visualization, please reference either of the provisional patent applications to which this application claims priority. As evident from the larger increments between the isothermal $I_{as}/I_s$ curves, the thermal gauge factor is larger for Raman modes at higher frequencies (e.g., the $v_1$ modes of CO and N2), which improves the SNR.

Specifically, the slope ($I_{as}/I_s$ vs. temperature) at a given temperature range is directly related to the ability to resolve incremental temperature changes; the steeper the curve is, the higher thermometry sensitivity via the intensity ratio method. High intensity ratios (and ratio changes) between the anti-Stokes and Stokes signal strengths improve that particular Raman mode's sensitivity and accuracy in temperature determination over that thermal range.

To find the optimal excitation laser that yields the highest thermometry sensitivity, we will test builds using identical routines/protocols, holding all else equal while varying the excitation laser wavelength. The ratios between the anti-Stokes to Stokes signal strengths (as a function of temperature) all increase with longer excitation laser wavelengths, with the increase more pronounced for Raman bands at higher frequencies. However, this improved thermal resolution comes at a slight cost to the spatial resolution due to the diffraction effects of longer laser wavelengths. To overcome this trade-off and complement the favorable gauge factor (high intensity ratio changes), we design the optics to yield high SNR with confocal pinholes and slits to resolve temperature changes within a tight focal volume.

We claim:

1. A metals-based additive manufacturing machine comprising:
   a metal powder base build stage adapted to receive a metal powder base for metals-based additive manufacturing of a desired artifact;
   a metals-based additive manufacturing light or electron beam source adapted to melt the metal powder base in predetermined patterns to form portions of the desired artifact as a part of the metals-based additive manufacturing;
   a metals-based additive manufacturing controller for directing steering of and emission from the metals-based additive manufacturing light or electron beam source to achieve the predetermined patterns, the metals-based additive manufacturing controller is optionally adapted to adjust the steering of and the emission from the metals-based additive manufacturing light or electron beam source in real time during the metals-based additive manufacturing based on received feedback comprising a three-dimensional temperature map of the melt pool, the three-dimensional temperature map optionally including a portion of the metal powder base and a formed portion of the desired artifact; and
   a hybrid temperature monitoring system comprising:
      a Raman spectrometer adapted to measure Raman scattering from Raman-active gas particles adjacent to the melt pool and optionally from Raman-active gas particles adjacent to the metal powder base, the Raman spectrometer is steerable to measure different locations on the melt pool and optionally different locations on the metal powder base, the Raman spectrometer is adapted to measure Stokes and anti-Stokes shifts;
      a single-element ultrasound transducer movable beneath or within the metal powder base build stage, the single-element ultrasound transducer adapted to transmit single-element acoustic pulses into the formed portion of the desired artifact, the metal powder base, and/or the melt pool during the melt, the single-element ultrasound transducer adapted to receive reflected single-element acoustic pulses from one or more single-element locations on a stage-powder interface between the metal powder base build stage and the metal powder base, a stage-artifact interface between the metal powder base build stage and the formed portion of the desired artifact, an artifact-powder interface between the formed portion of the desired artifact and the metal powder base, an artifact-melt interface between the formed portion of the desired artifact and the melt pool, a powder-melt interface between the metal powder base and the melt pool, and/or a melt-gas interface between the melt pool and surrounding gases, the single-element ultrasound transducer oriented to transmit the single-element acoustic pulses at an angle within 5° of normal relative to the stage-powder interface, the stage-artifact interface, the artifact-powder interface, the artifact-melt interface, the powder-melt interface, and/or the melt-gas interface;
      a phased-array ultrasound transducer pair located beneath or within the metal powder base build stage, the phase-array ultrasound transducer pair adapted to transmit phased-array acoustic pulses into the formed portion of the desired artifact, the metal powder base, and/or the melt pool during the melt, the phased-array ultrasound transducer pair adapted to received reflected phased-array acoustic pulses from one or more phased-array locations on the stage-powder interface, the stage-artifact interface, the artifact-powder interface, the artifact-melt interface, the powder-melt interface, and/or the melt-gas interface, the phased-array ultrasound transducer pair is steerable to measure reflections from different locations on the stage-powder interface, the stage-artifact interface, the artifact-powder interface, the powder-melt interface, and/or the melt-gas interface, the phased-array ultrasound transducer pair having a variable-focus ultrasound transmitter, the phased-array ultrasound transducer pair having a beamforming receiver, the phased-array ultrasound transducer pair oriented to transmit the phased-array ultrasound pulses at an angle of at least 5° away from normal relative to the stage-powder interface, the stage-artifact interface, the artifact-powder interface, the artifact-melt interface, the powder-melt interface, and/or the melt-gas interface;
   a processor; and
   a memory having stored thereon: (i) reference Raman spectra for the Raman-active gas particles and/or one or more equations derived from the reference Raman spectra; (ii) reference temperature-dependent acoustic impedances for the metal powder base build stage and/or the metal powder base; and (iii) instructions that, when executed by the processor, cause the processor to:
      a) receive Raman spectra from the Raman spectrometer for a plurality of the different locations on the melt pool and optionally a plurality of the different locations on the metal powder base;
      b) infer a surface temperature of the melt pool at the plurality of locations and optionally the metal powder base at the different locations by determining a temperature of the Raman-active gas particles by comparing the Raman spectra to the reference Raman spectra and/or by using data extracted from the Raman spectra in the one or more equations derived from the reference Raman spectra;
      c) receive pulse-echo signals from the single-element ultrasound transducer, the pulse-echo signals containing information regarding the reflected single-element acoustic pulses from the one or more single-element locations;
      d) receive beamformed signals from the phased-array ultrasound transducer pair, the beamformed signals containing information regarding the reflected phased-array acoustic pulses from the one or more phased-array locations;
      e) determine a volumetric temperature of at least a portion of the melt pool and optionally the portion of the metal powder base and the formed portion of the desired artifact using the pulse-echo signals, the beamformed signals, the reference temperature-dependent acoustic impedances for the metal powder base, and geometric information regarding the geometric relationship between the reflected single-element acoustic pulses and the reflected phased-array acoustic pulses; and
      f) generate the three-dimensional temperature map of the melt pool and optionally the portion of the metal powder base and the formed portion of the desired artifact using the surface temperature and the volumetric temperature and optionally deliver the three-dimensional temperature map to the metals-based additive manufacturing controller,
wherein the instructions, when executed by the processor, optionally cause the processor to receive timing information from the metals-based additive manufacturing controller, the Raman spectrometer, the single-element ultrasound transducer, and/or the phased-array ultrasound transducer pair, the surface temperature is optionally a time-variable surface temperature based on the timing information, the volumetric temperature is optionally a time-variable volumetric temperature based on the timing information, and the three-dimensional temperature map is optionally a time-variable three-dimensional temperature map based on the timing information, wherein the metals-based additive manufacturing controller and the processor are optionally the same device.

2. The metals-based additive manufacturing machine of claim 1, wherein the metals-based additive manufacturing controller is adapted to adjust the steering of and the emission from the metals-based additive manufacturing light or electron beam source in real time during the metals-based additive manufacturing based on received feedback comprising the three-dimensional temperature map of the melt pool.

3. The metals-based additive manufacturing machine of claim 1, the three-dimensional temperature map including the portion of the metal powder base.

4. The metals-based additive manufacturing machine of claim 1, the three-dimensional temperature map including the formed portion of the desired artifact.

5. The metals-based additive manufacturing machine of claim 1, wherein the processor is adapted to receive timing information from the metals-based additive manufacturing controller, the Raman spectrometer, the single-element ultrasound transducer, and/or the phased-array ultrasound transducer pair.

6. The metals-based additive manufacturing machine of claim 5, wherein the surface temperature is a time-variable surface temperature based on the timing information, the volumetric temperature is a time-variable volumetric temperature based on the timing information, and/or the three-dimensional temperature map is a time-variable three-dimensional temperature map based on the timing information.

7. The metals-based additive manufacturing machine of claim 1, wherein the metals-based additive manufacturing light or electron beam source is a M-AM light source.

8. The metals-based additive manufacturing machine of claim 7, wherein the metals-based additive manufacturing light source is a laser.

9. The metals-based additive manufacturing machine of claim 7, wherein the metals-based additive manufacturing light source is a Nd:YAG laser.

10. The metals-based additive manufacturing machine of claim 1, wherein the metals-based additive manufacturing light or electron beam source is a M-AM electron beam source.

11. The metals-based additive manufacturing machine of claim 1, wherein the Raman spectrometer is steerable to measure the different locations on the metal powder base.

12. The metals-based additive manufacturing machine of claim 1, wherein the single-element ultrasound transducer is movable beneath the metal powder base build stage.

13. The metals-based additive manufacturing machine of claim 1, wherein the single-element ultrasound transducer is movable within the metal powder base build stage.

14. The metals-based additive manufacturing machine of claim 1, wherein the phased-array ultrasound transducer pair is located beneath the metal powder base build stage.

15. The metals-based additive manufacturing machine of claim 1, wherein the phased-array ultrasound transducer pair is located within the metal powder base build stage.

16. The metals-based additive manufacturing machine of claim 1, wherein the single-element ultrasound transducer and the phased-array ultrasound transducer pair are independently movable.

17. The metals-based additive manufacturing machine of claim 1, where the single-element ultrasound transducer and the phased-array ultrasound transducer pair are movable in coordination with one another.

18. The metals-based additive manufacturing machine of claim 17, wherein the single-element ultrasound transducer and the phased-array ultrasound transducer pair are in a fixed physical relationship to one another.

19. The metals-based additive manufacturing machine of claim 18, the fixed physical relationship being used to generate the three-dimensional temperature map.

20. A metals-based additive manufacturing method comprising:
a) selectively melting, using planned operational parameters, a metal powder base in a predetermined pattern to form a first portion of a desired artifact as part of a metals-based additive manufacturing, the metal powder base located atop a metal powder base build stage;
b) introducing more of the metal powder base atop the first portion of the desired artifact formed in step a);
c) selectively melting, using the planned operational parameters, the metal powder base in a second predetermined pattern to form a second portion of the desired artifact as part of the metals-based additive manufacturing, the first portion and the second portion bonded to one another by the selectively melting;
d) iteratively introducing more of the metal powder base and selectively melting, using the planned operational parameters, the metal powder base in additional predetermined patterns to form additional portions bonded to one another, the first portion, and the second portion, thereby forming the desired artifact;
e) during the selectively melting of steps a), c), and/or d), acquiring Raman spectra from a Raman spectrometer for a plurality of different locations on a melt pool generated by the melting and optionally a plurality of different locations on the metal powder base, the Raman spectrometer adapted to measure Raman scattering from Raman-active gas particles adjacent to the melt pool and optionally from Raman-active gas particles adjacent to the metal powder base, the Raman spectra including Stokes and anti-Stokes shifts;
f) during the selectively melting of steps a), c), and/or d), acquiring pulse echo signals from a single-element ultrasound transducer, the pulse echo signals being reflected from one or more single-element locations on a stage-powder interface between the metal powder base build stage and the metal powder base, a stage-artifact interface between the metal powder base build stage and the first portion of the desired artifact, an artifact-powder interface between the first portion, the second portion, or one of the additional portions of the desired artifact and the metal powder base, a powder-melt interface between the metal powder base and the melt pool, and/or a melt-gas interface between the melt pool and surrounding gases, the single-element ultrasound transducer oriented to transmit the single-element acoustic pulses at an angle within 5° of normal relative to the artifact-powder interface, the powder-melt interface, and/or the melt-gas interface;

g) during the selective melting of steps a), c), and/or d), acquiring beamformed signals from a phased-array ultrasound transducer pair, the beamformed signals reflected from one or more phased-array locations on the stage-powder interface, the stage-artifact interface, the artifact-powder interface, the powder-melt interface, and/or the melt-gas interface;

h) generating a three-dimensional temperature map of the melt pool and optionally the portion of the metal powder base and the first portion, the second portion, or the additional portions of the desired artifact using a surface temperature and a volumetric temperature, the surface temperature inferred by determining a temperature of the Raman-active gas particles by comparing the Raman spectra to reference Raman spectra and/or by using data extracted from the Raman spectra in one or more equations derived from the reference Raman spectra, the volumetric temperature determined using the pulse-echo signals, the beamformed signals, reference temperature-dependent acoustic impedances for the metal powder base, and geometric information regarding the geometric relationship between the reflected single-element acoustic pulses and the reflected phased-array acoustic pulses; and i) adjusting one or more of the planned operational parameters for the selective melting of steps c) and/or d) or future planned operational parameters for a subsequent selective melting in a subsequent metals-based additive manufacturing of a subsequent desired artifact based on the three-dimensional temperature map.

* * * * *